Patented Dec. 12, 1933

1,938,585

UNITED STATES PATENT OFFICE 1,938,585

DISINFECTANT

William L. Estabrooke, Yonkers, N. Y.

No Drawing. Application December 31, 1930
Serial No. 505,987

6 Claims. (Cl. 167—19)

This invention relates to new compositions of matter, more especially to compositions adopted for the treatment of seeds and plants to disinfect and to kill disease organisms which infest the same.

It is among the objects of my invention to provide a composition which is highly effective in the extermination of disease of seeds and plants, which does not have any injurious effects on the seeds or plants, which will aid in the germination of seeds, which will stimulate growth and which is simple and easy to prepare at a comparatively low cost of manufacture.

My invention is based upon the discovery that ureas readily react with the soluble salts of the heavy metals which have toxic properties such as mercury, lead, cadmium, zinc, silver and copper, to form complexes which are generally insoluble in the reaction medium and which may be easily recovered therefrom. The urea may be dissolved in water and the heavy metal salt is also dissolved in water. The two solutions are then mixed, whereupon a reaction takes place in the cold generally, formng an insoluble complex which precipitates out and is recovered by simple filtration, washing and drying. The resulting complex has very strong toxic properties and it is therefore diluted with a large amount of inert, finely divided diluent to decrease the toxic properties and to increase the covering or spreading power thereof.

Instead of water as the solvent, I may use organic solvents for each or both of the ingredients and cause the reaction to take place as above indicated. If the reaction product is soluble in the solvents used, it may be recovered by evaporation or in any other manner.

More specifically my invention is illustrated by the following example: I provide a water solution of thiourea and also a water solution of mercuric chloride. The mercuric chloride solution is added to the thiourea solution slowly and with constant stirring. The proportions of the ingredients are about two mols thiourea to one mol mercuric chloride. A white precipitate is formed in the cold and it is filtered off, washed and dried. The product is most probably an addition product of the two ingredients and is mixed with talc in the proportions of 15 parts complex to 85 parts of talc.

The composition is practically insoluble in water and therefore has no tendency to injure the seeds even tho it contains a toxic metal. By reason of the presence of the thiourea, the complex has a very powerful and favorable effect on the germination of the seeds and growth of the plants. The material is cheap and easy to prepare, as I utilize simple and readily obtainable compounds having a comparatively low cost. Also, the procedure in the preparation of my disinfectant is extremely simple, not requiring the services of skilled chemists which has been necessary in seed and plant disinfectants previously known.

Altho I have described my invention setting forth a single specific embodiment thereof, it is not limited thereto as variations in ingredients and in procedure are within the scope of my invention. For instance, I may utilize ureas and thioureas and substitution products thereof, such as phenyl-thiourea instead of the thiourea. In place of the mercuric chloride, I may use chlorides of lead, cadmium, zinc, silver or copper or other toxic metal. Instead of chlorides, I may use other negative radicles of inorganic or organic nature such as nitrate, sulphate, acetate, etc., provided they do not interfere with the precipitation of the complex. It is not necessary to have a ratio of two mols of the urea to one of the heavy metal salt, as other ratios may be suitable with good results, but the ratio should be such that a complex is formed. These and other changes in ingredients and in procedure may be made without departing from the spirit of my invention the scope of which is defined in the claims appended hereto.

What I claim as my invention is:—

1. A disinfectant which is the reaction product of a urea and a heavy metal salt.

2. A disinfectant which is the reaction product of thiourea and mercuric chloride.

3. A disinfectant which is the reaction product of a thiourea and a heavy metal salt.

4. A disinfectant which is the reaction product of a thiourea and a salt of one of the following metals: mercury, lead, cadmium, zinc, silver and copper.

5. A seed disinfectant which is the reaction product of about two mols of a thiourea and one mol of a heavy metal salt.

6. A seed disinfectant which is the reaction products of about two mols of thiourea and one mol of mercuric chloride.

WILLIAM L. ESTABROOKE.